United States Patent [19]
Anstey

[11] 3,961,306
[45] June 1, 1976

[54] METHOD OF FORMING COLOR GRAPHIC DISPLAYS FROM INPUT DATA

[75] Inventor: Nigel A. Anstey, Sevenoaks, England

[73] Assignee: Seiscom Delta Inc.

[22] Filed: May 23, 1975

[21] Appl. No.: 580,437

Related U.S. Application Data

[62] Division of Ser. No. 300,718, Oct. 25, 1972, abandoned.

[30] Foreign Application Priority Data

Oct. 28, 1971 United Kingdom............... 50199/71

[52] U.S. Cl. ....................... 340/15.5 DS; 346/33 C; 346/46; 346/107 SC; 343/5 CD
[51] Int. Cl.²............................................ G01V 1/34
[58] Field of Search................. 340/15.5 DS, 324 A, 340/324 M; 358/81; 355/2, 4, 6, 32; 346/33 C, 46, 107 SC, 33 ME; 101/211; 343/5 CD

[56] References Cited
UNITED STATES PATENTS

| | | | |
|---|---|---|---|
| 3,504,975 | 4/1970 | White | 358/81 |
| 3,693,178 | 9/1972 | Braun et al. | 346/33 ME |
| 3,749,823 | 7/1973 | Warner | 358/81 |

OTHER PUBLICATIONS

Balch, "Color Sonograms...", 12/71, pp. 1074–1098, Alophysics, vol. 36, No. 6.

*Primary Examiner*—Nelson Moskowitz
*Attorney, Agent, or Firm*—Pravel & Wilson

[57] ABSTRACT

A new and improved method of forming color graphic displays from input data is disclosed. In the displays so formed differing colors quantitatively identify and indicate differing values or ranges of values of the data. The input data are processed to determine sample values for data display points, and numerical codes from an assignment table are assigned according to the sample values. The assigned codes are arranged into output sequences for each of plural component displays of the final display, and the component displays formed and displayed in superposition to form the color graphic display with colors therein graphically indicating the data.

28 Claims, 13 Drawing Figures

METHOD OF FORMING COLOR GRAPHIC DISPLAYS FROM INPUT DATA

The present application is a division of U.S. Pat. application Ser. No. 300,718 filed Oct. 25, 1972, copending herewith, and now abandoned.

CROSS-REFERENCE TO RELATED APPLICATION

The present invention relates to methods of displaying waveforms, such as those indicating seismic and geophysical measurements, as does my co-pending application "Multi-Variable Seismic Display" (U.S. Ser. No. 300,672, filed Oct. 25, 1972, as well as other waveforms indicating scientific or technical measurements.

BACKGROUND OF INVENTION

1. Field of Invention

This invention is concerned with the display in color of variables which may be presented as waveforms and graphs. It is also concerned with the combined display, for visual appraisal, of several quantities which are different functions of the same variable or variables.

2. Description of Prior Art

In several branches of science useful conclusions can be drawn from variations of several quantities as a function of a common variable. One example is in seismic exploration, where the geological value of the conventional display of seismic vibration as a function of reflection time may be enhanced, by adding to the display further variables (such as interval velocity). Another example is in the interpretation of acoustic, electric, neutron and other logs taken in a borehole as a function of depth. Another example is in the interpretation of gravity and magnetic field readings taken as a function of distance along a profile. Another example is in the interpretation of medical waveforms (such as electroencephalographic signals as a function of time). Another example is in the formulation of a fault-condition diagnosis from a number of transducers (which may be in an engine, or a computer, or in the human body).

Where the expected nature of the relationship between several functions can be expressed mathematically, it has been usual to employ the techniques of cross-correlation to obtain a numerical measure of this relationship. In appropriate applications these techniques were very powerful, being able to find relationships between functions when such relationships could not be detected by visual examination of the corresponding waveforms. However, cross-correlation techniques were better than visual examination only if the integration intervals were long enough to include many cycles of variation and if there is no significant variation of the common-variable axis. Further, the need for visual correlation remained in every case where a skilled human judgment had to be made on the significance of the correlation, and where this skill had not yet advanced to the stage where the basis for judgment could be quantified. These situations existed in the aforementioned examples of geology, log analysis, medicine and brain research, and in other technological arts.

SUMMARY OF INVENTION

Briefly, the present invention provides a new and improved method for juxtaposed or superposed display, in color, of a plurality of physical measurements which represent different functions of the same variable. These displays may be associated with the display of further such functions in the variable-area or variable-density form of optical recording of images on film. It has been found that such displays convey to the eye of the analyst, very quickly and easily, information on various types of relationships which exist between the several functions.

Accordingly it is an object of the invention to display a plurality of functions of the same or a related variable in the form of one or more colored traces.

It is a further object to provide a composite display of a plurality of functions of the same or a related variable, in which one such function is displayed in variable-area form and in which the color of the area normally black or normally white may be modulated in accordance with a further such function or functions.

It is a further object to provide a composite display of a plurality of functions of the same or a related variable, in which one such function is displayed in conventional variable-density form and in which the other functions are used to modulate the color of the light or dark parts of the variable-density trace.

The invention therefore provides a method of making a combined display of a plurality of functions of the same or a related variable, by preparing each such function in a form suitable for display as a trace of a distinctive color, whose linear extent represents the independent variable and in which the intensity of color represents the magnitude of the function, and by merging the plurality of such displays so that particular relationships between the magnitudes of the several functions are characterized by particular mixed colors.

It also provides a method of making a combined display of a plurality of functions of the same or a related variable by constructing for each such function a colored trace whose linear extents represents the independent variable and whose local color changes to represent the local magnitude of the function, and by arranging such plurality of traces in appropriate positions relative to each other in order to facilitate visual appraisal.

It also provides a method of associating either of the above plural displays with the display of an additional function represented in black or shades of grey by the superposition of a variable-area or variable-density trace.

It also provides a color key by which the local color of a trace may be interpreted quantitatively in terms of the variable it represents.

DESCRIPTION OF PREFERRED EMBODIMENT

Figure 1:
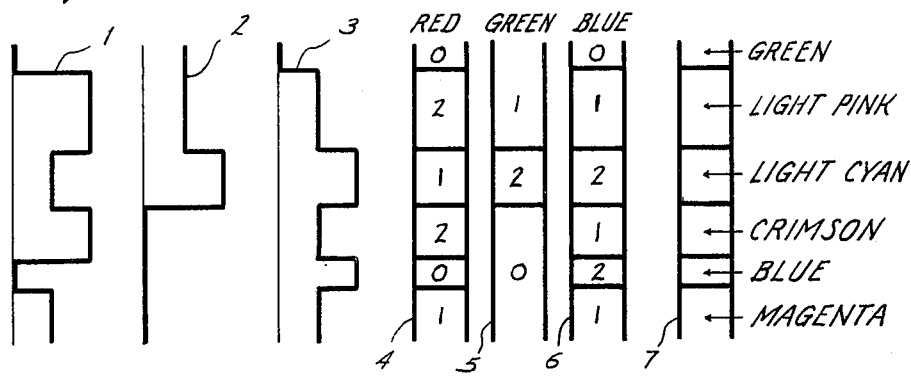
FIG. 1 shows three functions of the same variable, together with their separate and combined representations as colored traces.

In the drawings FIG. 1 illustrates one form of display according to the present invention. Waveforms 1, 2 and 3 are displays of three signals of functions of a common variable; these might represent, for example, different physical measurements, obtained in a borehole, as a function of depth in the borehole. With a first embodiment of the present invention, each such variable is plotted as a variable-density trace of a distinctive color. As shown at 4, the trace corresponding to function 1 is displayed in shades of red; three densities of red are used, to represent the three levels present in the function in waveform 1, and these three densities are given density levels or values 0, 1 and 2. Similarly the second function in waveform 2 is represented in FIG. 1 as a trace 5 exhibiting three density levels of green, and the third function in waveform 3 as a trace 6 exhibiting three density levels of blue. The three traces may be of equal width, and plotted to the same scale of the independent (vertical) variable of depth; the three colors are selected as being distinctive, and may be the primary colors, their complements, or any other suitable hues. The present invention then provides for the superposition of these three traces to yield a composite trace 7. This trace exhibits color variations, as indicated (FIG. 1), which represent and identify particular combinations of values for the three contributory functions or waveforms 1, 2 and 3. It has been found that such a display according to the present invention is of great value for the visual identification of particular borehole conditions which may be detected or discerned only as a combination or resultant of several effects.

Figure 2:
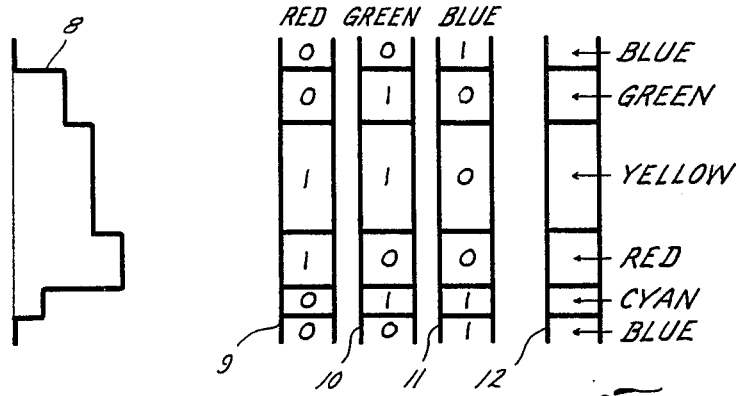
FIG. 2 shows a single function of a variable, the manner of resolving the variable into three colored traces, and the superposition of the latter to yield one multi colored trace representative of the variable.

FIG. 2 illustrates another form of display according to the present invention, representing in different colors different levels or values of a single variable function. Waveform 8 is a form of such a function, having in this case five levels of variation. From this single function are constructed in a manner to be set forth below, three variable-density traces 9, 10 and 11, colored in three distinctive colors. As has been set forth, these colors may be the primary colors or their complements. It should be understood that although in the example illustrated the five levels of variation in the waveform 8 are represented with only two levels of density for each of the three colored traces, the practice of the invention is not limited to this particular example. The three traces 9, 10 and 11 are superposed to form the composite trace 12, in which the five levels of variation in the original waveform 8 are represented by five distinguishable colors as indicated (FIG. 2). By extension of the principle of this embodiment, a continuum of values for the original waveform may be represented by a continuum of hues across the whole range of primary and mixed colors.

Figure 3:
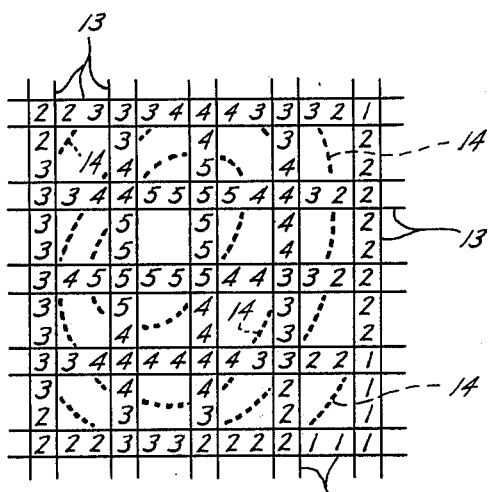
FIG. 3 shows the application of the technique of FIG. 2 to the problem of contouring.

FIG. 3 illustrates an application of this embodiment to the technique of contouring. In several forms of geophysical exploration, for example, it is desirable to contour the geophysical measurements which are made along lines. The lines are assembled forming a grid which is plotted on a map. In FIG. 3 these lines are represented, in their assembled positions on the map, by colored traces 13. In FIG. 3, the value of the measurement at positions along each line is represented by a numeral from 1 to 5, plotted in the appropriate positions for each of the lines on the grid. It should be understood that each of the numbers 1 through 5 represent a particular color (for example, from blue for low level to red for high level measurements as in FIG. 2). In this way contouring lines 14 in the conventional sense are hardly necessary; the high measurement areas stand out as red portions where the lines cross them, and the low areas are indicated in a like manner as blue. The merit of this display, contrasted to one in simple variable-density, is the increased dynamic range and the increased visual impact afforded by the color in the traces. An analyst using this method can gain a prompt appraisal of the extent and location of different measurement levels from the amount and placement of the different colors in the grid.

Figure 4:
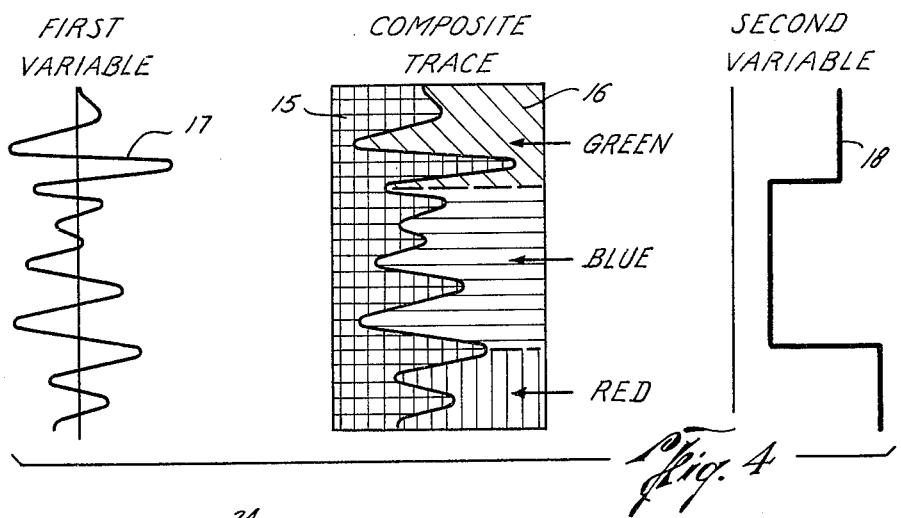
FIG. 4 illustrates the technique of superposing a variable-area trace representing one variable function and a colored trace representing another variable function.

FIG. 4 illustrates superposition of a colored trace on a conventional variable-area trace. The terms "variable-area" and "variable-density" as used hereinbelow are used in the sense established in the technology of optical recording of sound on film; a variable-area track or trace is one in which the black area of a partly-black-partly-white trace is modulated in accordance with the dependent variable, and a variable-density track or trace is one in which the grey density of a constant-width trace is so modulated. The area 15 which is black on the variable-area trace to indicate a variable being measured remains black, but the area 16 which is white in the prior art is colored, as will be set forth. In this way two variables 17 and 18 are displayed on the same trace, and their inter-relation is more easy to perceive. Equally well, the information displayed in variable-area form may be displayed in variable-density form; in this case the color is clearly seen in those regions in which a conventional variable-density trace would be white or grey. Several examples applications of the technique of FIG. 4 are set forth below.

The first example is the addition of interval-velocity information to a seismic cross-section. Such cross-sections normally involve side-by-side display of hundreds of conventional variable-area or variable-density traces, each representing the reflection response of the layered earth observed from a particular point on the surface. According to this embodiment of the invention, there is superimposed (on some or all of these traces) color information representing auxiliary seismic variables which are, like the reflection traces themselves, functions of reflection time. Typical of these auxiliary seismic variables is the interval velocity-computed, by techniques well known in the art, between particular reflectors (see, for example, "Velocity Spectra - Computer Derivation of Velocity Function" by Taner and Koehler, Geophysics 1969 vol. 34 p. 859). Such computations may result in interval-velocity values between 1500 and 6500 meters/second, and it has been found that these may be displayed conveniently according to the present invention in from approximately 20 to 30 steps of color from blue to orange-brown, with each successive step representing a velocity increment of 150 or 200 meters/second. When the computations of interval velocity are performed and displayed continuously across the seismic section, there results a very intelligible display which adds easily-assimilated information on the lithology of the area. Further, the color display so formed removes the need for lateral averaging of the interval velocity values; the analyst can assess without difficulty both the mean color, indicating velocity, and the scatter of the measurements.

A second example of an auxiliary variable which may be superimposed in color on a seismic section is an estimate of cross-dip. This is a measure of the component of reflector dip transverse to the line of profile, obtained by scanning in this direction across the results obtained by a three-dimensional field technique (see, for example, "Three-Dimensional Seismic Method" by Walton, Geophysics 1972, vol. 37, p. 417). The auxiliary variable, in this case, is a measure of cross-dip obtained from the cross-members of the spread. This is conveniently done by first scanning the profile itself for reflection alignments extending each side of the intersection with the cross-members, and then by searching for corresponding alignments on the cross-members. Thus a time waveform may be obtained at each intersection, in which positive cross-dips are represented by corresponding positive numbers, in which negative cross-dips are represented by corresponding negative numbers, and in which all values not associated with a reliable cross-dip measurement are set to zero. If desired, these waveforms may be given a slight degree of averaging in the direction of the profile. They then become the auxiliary variable to be displayed in combination with the reflection profile itself. They may be displayed, for example, so that reflection alignments which originate well in front of the plane of section are colored red, those in the plane of section are colored yellow, and those which originate well behind the plane of section are colored blue with appropriate gradation between these extremes.

A third example of an auxiliary variable which may be superimposed in color on a seismic section is a measure of coherence between the elements of common-depth-point gathers entering the stack, as determined by computing according to the method disclosed in "Semblance And Other Coherency Measures For Multichannel Data" by Neidell and Taner, Geophysics 1971, vol. 36, p. 482. This gives an immediate and forceful indication of those reflectors which are shown to be primary reflectors on the basis of the velocity distribution employed.

A fourth example is a measure of the strength of individual reflections, which may be adjusted by reference to a known reflection coefficient and to measured spectral change in order to represent effective reflection coefficients, as determined by computing according to the method disclosed in "Reflections on Amplitudes" by O'Doherty and Anstey, Geophysical Prospecting 1971, pp. 430–458. This is illustrated in FIG. 5, as a suitable example of the general principle of the display in color of auxiliary seismic measurements.

Figure 5:
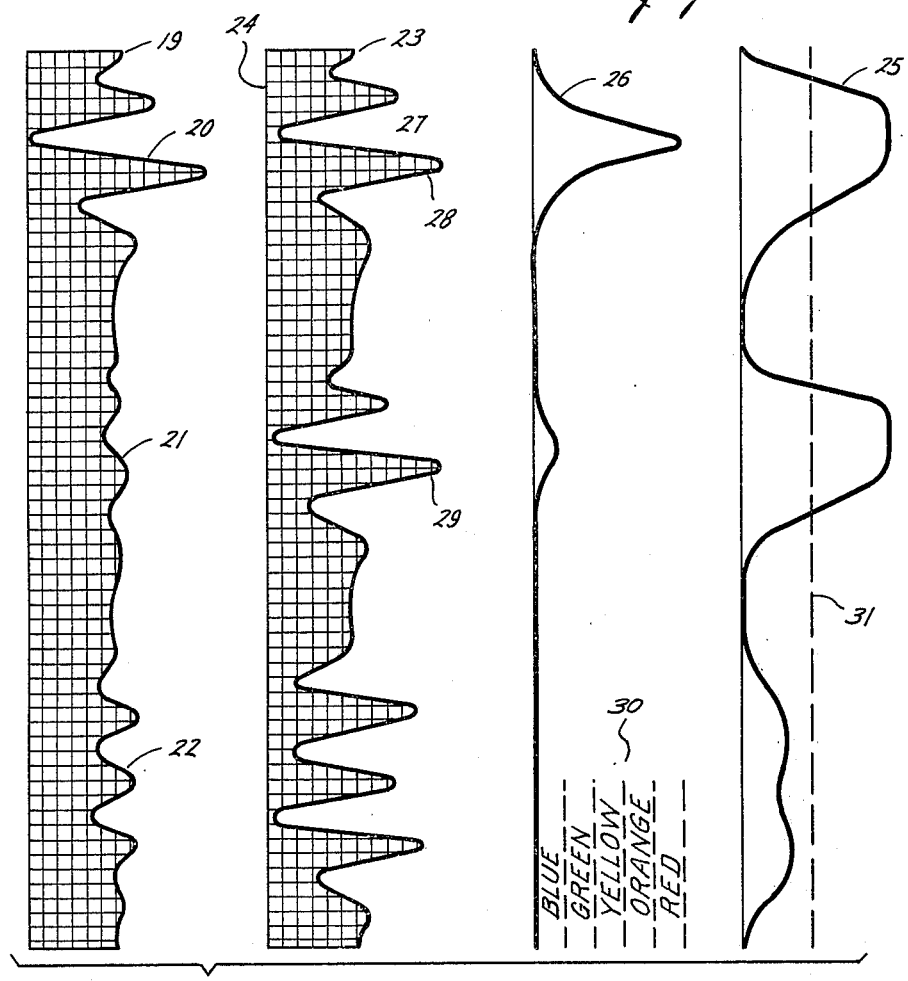
FIG. 5 shows the application of the invention to a problem in seismic prospecting. It represents, in four vertical waveforms: a variable-area seismic trace displayed with true amplitude relationships, the same trace after amplitude equalization, a measure of reflection strength for the first two events and the general manner of its representation in color and a measure of the stacking coherence of the reflection events on the assumption that the first two events are primary reflections and that the third is a multiple.

In FIG. 5, a seismic reflection trace without time-varying amplitude manipulations such as automatic gain control or equalization is shown at 19, in the familiar variable-area representation. Three reflection events are depicted: a high-amplitude primary reflection at 20, a low-amplitude primary reflection at 21, and a low-amplitude multiple reflection at 22. It is a common observation that if the entire trace is displayed at a level appropriate to reflection 20, then the low-amplitude multiple reflection 22 is kept suitably subdued but the low-amplitude primary reflection 21 cannot be seen as clearly as the analyst or interpreter would wish. Therefore it is usual to apply some sort of trace equilization, by which different scale factors are applied to the reflections to keep their amplitudes comparable; the effect of this is seen in the equalized trace 23. However, this has three well-known disadvantages: the true amplitude relationship between different primary reflections is lost, the multiple reflections attenuated by the stacking process are restored to obtrusive amplitudes, and the background noise is likewise elevated in amplitude.

In this application of the present invention the color of the equalized trace 23 is modulated by a measure of the strength of the reflections on the original unequalized trace 19. An example of this measure of strength appears at 26. To a degree, as disclosed in the "Reflections on Amplitudes" reference above, this measure of strength may be interpreted in terms of the apparent reflection coefficient of the reflecting interface.

This strength variable is then used to modulate the color of either the "black" part 24 or the "white" part 27 of the variable-area trace 23. Thus reflections with high real amplitude (such as 28) are modulated to a red color; reflections with low real amplitude (such as 29) are modulated to a blue color. Intermediate amplitudes are represented by intermediate spectral hues, as shown generally by the color levels 30.

This approach is sufficient to distinguish between reflections of high and low amplitude (such as distinction between 20 and 21) but does not itself distinguish between low-amplitude primary reflections and low-amplitude multiple reflections (such as distinction between 21 and 22). Neither does it permit discrimination between reflections and noise. Therefore, in a further embodiment of the invention, the information from the strength variale 26, determined as set forth above, is combined with that from the coherence variable 25, determined in the manner set forth. For example, the strength variable 26 is plotted in the appropriate spectral color only if the coherence variable 25 exceeds a preset threshold value which may be fixed or time variant. Such a threshold is shown generally by the dashed line 31. Since the coherence exceeds the threshold 31 both on the high-amplitude event 20 and the low-amplitude event 21, both are modulated to their corresponding color. However, since the coherence on the multiple reflection 22 is poor, the latter is either left or colored to a natural grey. This display, therefore, identifies those reflections which are both strong and primary on the basis of the velocity distribution employed, indicating these as the ones appropriate to the calculation of interval velocities.

It should be understood that in the foregoing material the word "strength" may be used to represent any one of several possible measures of magnitude of the reflection signal.

In particular, the strength may be represented by the numerical (that is, 'rectified') value of the amplitude of the seismic signal, or by the square or other power of the amplitude, or by a time-averaged or smoothed version of either of these. A preferred measure is that of the instantaneous energy of the signal, evaluated by summing the potential energy and the kinetic energy represented by the waveform, according to techniques well known in the art. This measure of strength has the virtue of being smoothly varying, and of stressing that part of the seismic event which may be expected to travel with a velocity most closely approximating to that characteristic of the transmitting medium. However, other measures may be used, including in particular a simple smoothed version of the rectified amplitude.

Whatever the measure of strength employed, the resulting color display may be calibrated in terms of the apparent reflection coefficient of the seismic events. Thus it may be arranged that apparent reflection coefficients in the range above 0.2 are indicated by a red color, those between 0.15 and 0.2 by orange, between 0.1 and 0.15 by yellow, between 0.05 and 0.1 by green and between 0 and 0.05 by blue.

Figure 6:
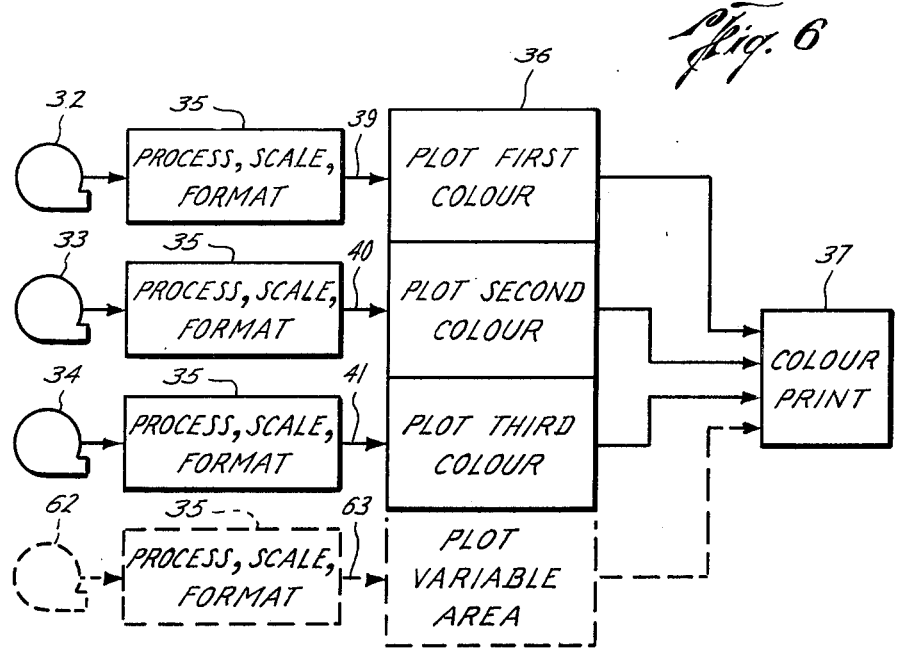
FIG. 6 shows, in block-diagram form, the stages of operating on three input variables to make one or more colored traces, and the manner of superimposing a fourth variable in variable-area form.

FIG. 6 illustrates the method steps of forming the display of FIG. 1. In this figure the three variable functions or waveforms 1, 2 and 3 are recorded on three tapes 32, 33 and 34, in the conventional manner, from which they may be called out on demand. At step 35 they are each then suitably processed (for example, filtered) according to techniques well known in the art, and then scaled and formatted in a manner appropriate to the type of plotter to be used. The plotting step 36 plots each of the three signals in a distinctive color, with the intensity of each color being related to the level of the particular associated original variable 32, 33 and 34, and further allows the superposition of light of three distinctive colors and the recording of the superposition of these three colors on the color print 37.

Figure 7:
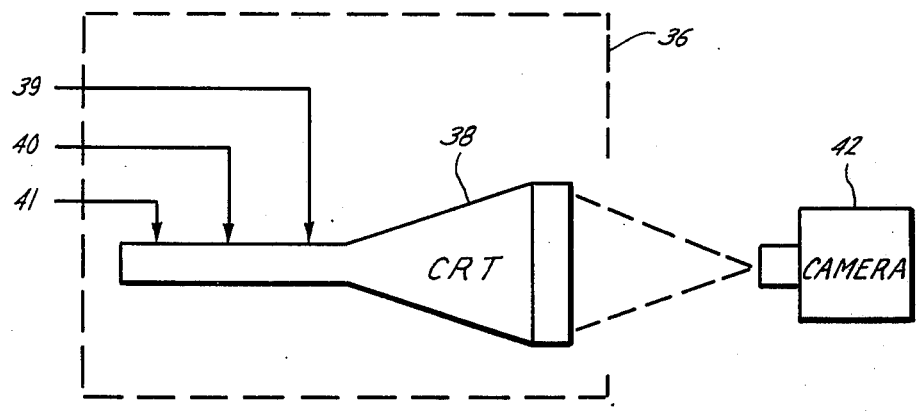
FIG. 7 shows how the plotting operations of FIG. 6 may be accomplished simultaneously, using a color cathole-ray-tube.

FIG. 7 illustrates generally how the function of step 36 (FIG. 6) is accomplished by means of a color cathode ray tube 38, which may be of any type well known in the art. The three plot signals 39, 40 and 41 correspond to the output of the three formatting stages 35 in FIG. 6. The final color print 37 may be made by contact exposure on the face of the cathode-ray tube (for which usage the faceplate of the tube is preferably of the fiberoptic type), or by standard photographic techniques using a conventional camera 42.

Figure 8:
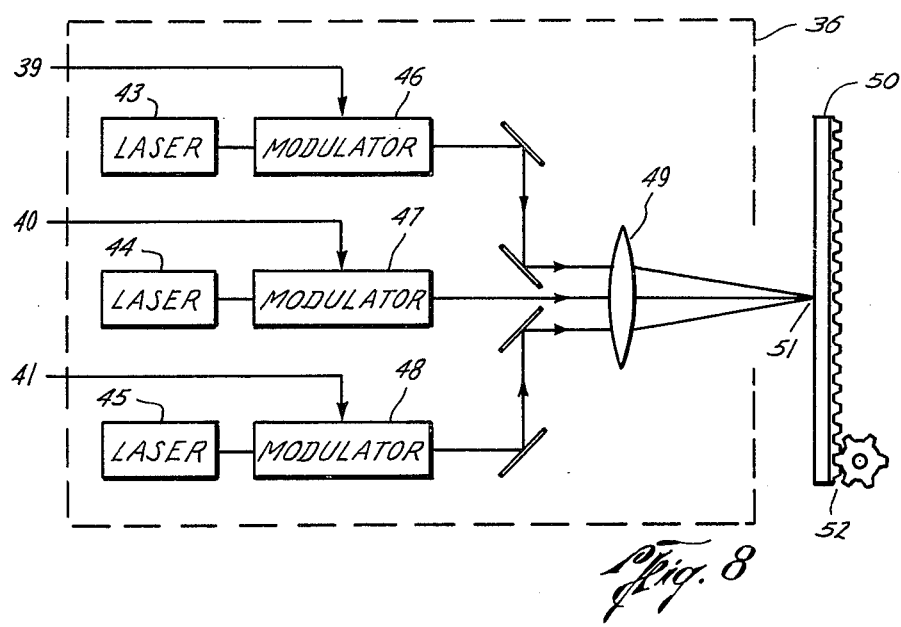
FIG. 8 shows how the plotting and printing operations of FIG. 6 may be accomplished simultaneously, using three modulatable light sources of distinctive colors and colour photographic material.

FIG. 8 illustrates generally how the function of step 36 (FIG. 6) is accomplished by the modulation of three sources of colored light. For example, these sources may be lasers 43, 44 and 45, each of a distinctive color and connected to a Pockel-cell modulator 46, 47 and 48. The three light beams are combined in lens 49 and focused onto color film 50. The representation of the independent variable is then formed by motion of the combined light image 51 relative to the film 50. This may be by scanning of the image across a stationary film by means of moving mirros (not shown) or by movement of the film 50 by means of the traversing mechanism shown generally at 52. It should be understood that the combination of lasers 43, 44 and 45 and modulators 46, 47 and 48 may be replaced by alternative sources of light. Glow-modulators, incandescent lamps and light-emitting diodes are examples of alternative light sources and each of these may be used in combination with optical filters to improve the separation of the colors.

Figure 9A:
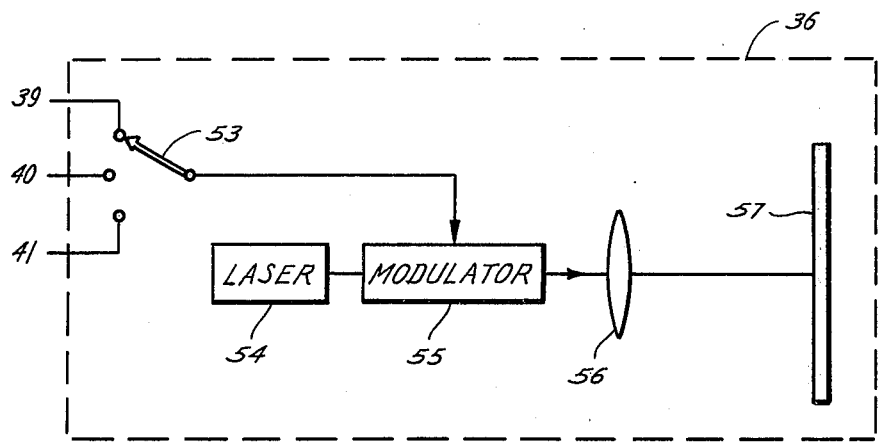
FIG. 9A shows how the plotting operations of FIG. 6 may be accomplished sequentially using a single modulatable light source and black-and-white photographic material.

FIG. 9A illustrates generally how the function of step 36 may be accomplished by the sequential use of a single modulatable light source. The modulation apparatus 55 is connected to the three plot-control signals 39–41 in turn, as indicated by the switch 53. A separate variable-density trace is made on a strip of monochrome film 57 in combination with the optical system 56 and a traversing mechanism (not shown, but similar to that illustrated at 52 in FIG. 8) for each of the three plot-control signals. Each of the three traces so made is then dyed by well-known chemical means (not shown) to a suitable distinctive color.

The three film strips 57a, 57b and 57c so formed by the apparatus of FIG. 9A carrying these colored traces are then placed in registration in front of a broad light source 58 (FIG. 9B) and photographed by a conventional camera 42.

Figure 9B:
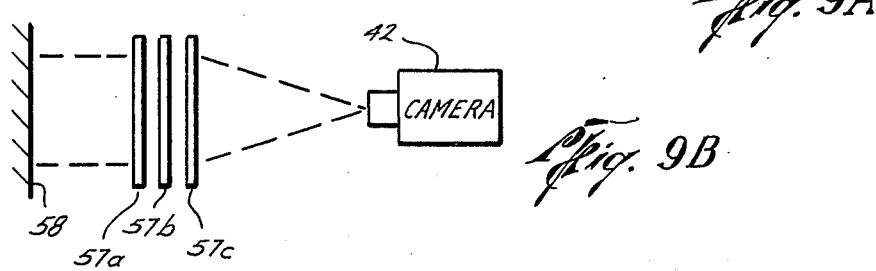
FIGS. 9B and 9C show two variations on the color printing operation which may be associated with FIG. 9A.

An alternative method to that of FIG. 9B is that the final color print 60 (FIG. 9C) is made by three separate exposures to the light source 58, each with a distinctive color of light. Light from the broad source 58 is filtered through optical filter 59 and used to expose color material 60 through the first monochrome film 57a; subsequent exposures of the other two monochrome films 57b and 57c, in registration, are made through different optical filters 59 having distinctive colors.

As set forth hereinbefore, the three colors employed may conveniently be the primary colors or their complements, according to the order and number of photographic processes and the final effect desired. In a preferred embodiment of the technique represented by FIGS. 6, 9A and 9C, the processing steps 35 include the complementation of the variable function (for example, by its subtraction from a fixed large number) so that the plot instructions 39, 40 and 41 represent a negative photographic image. For example, for a variable function 32 due to be represented by the intensity of red on the final print 37, a large value of the variable 32 is represented by an instruction 39 to plot at a light-grey density on monochrome film 57. When the optical filter 59 is blue-green, an intense blue-green light is then transmitted through the light-grey density of the film 57 to the color print material 60. This produces, after photographic processing, an intense red coloration at the trace position appropriate to the said large value of the variable 32, due to the heavy blue-green filter 59. Correspondingly, a small value of the variable 32 produces a dark-grey density on film 57, a weak blue-green illumination of the print 60, and a weak red coloration on the processed print 60. Similar processes are used for variable 33, employing a red-green filter 59 and producing a blue image on the print 60, and for variable 34, employing a red-blue filter 59 and producing a green image on the print 60. With this technique, a suitable material for the print 60 is Ektacolor RC37, marketed by Kodak Limited.

As set forth with respect to FIG. 4, it is desirable to superimpose a variable-area trace 15 on the colored trace, with the variable-area trace representing a fourth variable. In Fig. 6 the steps corresponding to this additional input are shown in phantom; the variable itself is derived from storage medium 62, suitably scaled and formatted in the manner set forth at step 35, and plotted in variable-area plotter according to plot insturctions 63. The variable-area film so obtained from the plotter is used as a fourth stage in the above color-printing sequence; the film in this fourth stage is used in conjunction with the white light 58, either with no filter at 59 or with a special filter matched to give a good black from the light 58 and the paper 60 in use.

Although the "red" exposure, the "blue" exposure, the "green" exposure and the variable-area "black" exposure have been described in that order, any other convenient and suitable order may be used.

Also as discussed hereinbefore, the fourth input to be superposed on the color traces may be in variable-density instead of variable-area, with the operational sequence performed as described above.

Figure 9C:
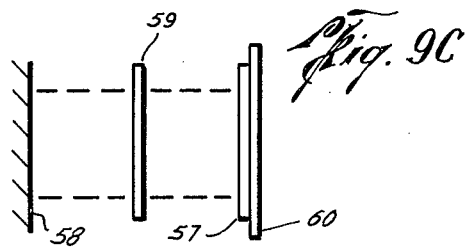

In the sequence represented by Figs. 6, 9A and 9C, the function of step 35 is conveniently effected by a suitable digital computer and the function of step 36 by an LGP 2703 Laser Graphic Plotter developed by SIE - Dresser Industries of Houston, Texas. This machine and others of similar type represent a preferred means of performing the function of step 36, since they allow accurate digital control of photographic densitites.

In the aforesaid digital plotter, a monochrome photographic film is exposed by a laser beam, which builds up a complete photographic picture as a matrix of small dots. The intensity of each dot is under digital control; a 4-bit word associated with each dot defines 16 tones from black through 14 shades of grey to white (or clear). The beam scan defines one dimension of the display (normally taken as that of the independent variable), while the indexing of the film between scans defines the other dimension.

In the prior art, this plotter was used for making variable-density seismic cross-sections by reducing the dynamic range of the normal reflecton signal to 4 bits, by presenting each trace in turn to the computer controlling the plotter, and by building up the trace to the required width by making an appropriate number of identical scans.

Again in the prior art, this plotter was used for making variable-area seismic cross-sections by building up each trace as an appropriate number of different scans, the difference between scans being determined by a logical discrimination program designed to construct a variable-area trace in a stepwise manner. In this variable-area case only a single bit was used to define the condition of any dot on the scan.

In my copending application Ser. no. 300,672, referred to hereinabove, the method of controlling this plotter for the display of more than one variable function, in monochrome, is described in connection with seismic cross-sections. For example, the usual seismic vibration may be displayed as a variable-area trace, while a second numerical function, such as a measure of the coherence between several samples of the vibration, is displayed as density variations in the "black" part of the said variable-area trace. Alternatively, the second function may be used to deflect the "zero-deflection" position of the variable-area trace, or to modulate the "zero" grey-level value of a variable-density trace.

In the present invention the machine is used with the variable-area and variable-density plotting techniques described above. The three color-plot signals 39, 40 and 41 are used to make three separate variable-density traces (corresponding to traces 4, 5 and 6 in FIG. 1) in the manner set forth above for making variable-density traces. Similarly a variable-density grey trace may be made to be superimposed on the color trace. Also, a variable-area black-clear trace 15 to be superimposed on the color trace 16 (as in FIG. 4) may be prepared by the variable-area technique described above.

The techniques set forth above are also adapted to display of a single waveform in color (as in FIG. 2) and the superposition on such a color display of another variable in variable-area or variable-density form as set forth with respect to FIG. 5.

Figure 10:
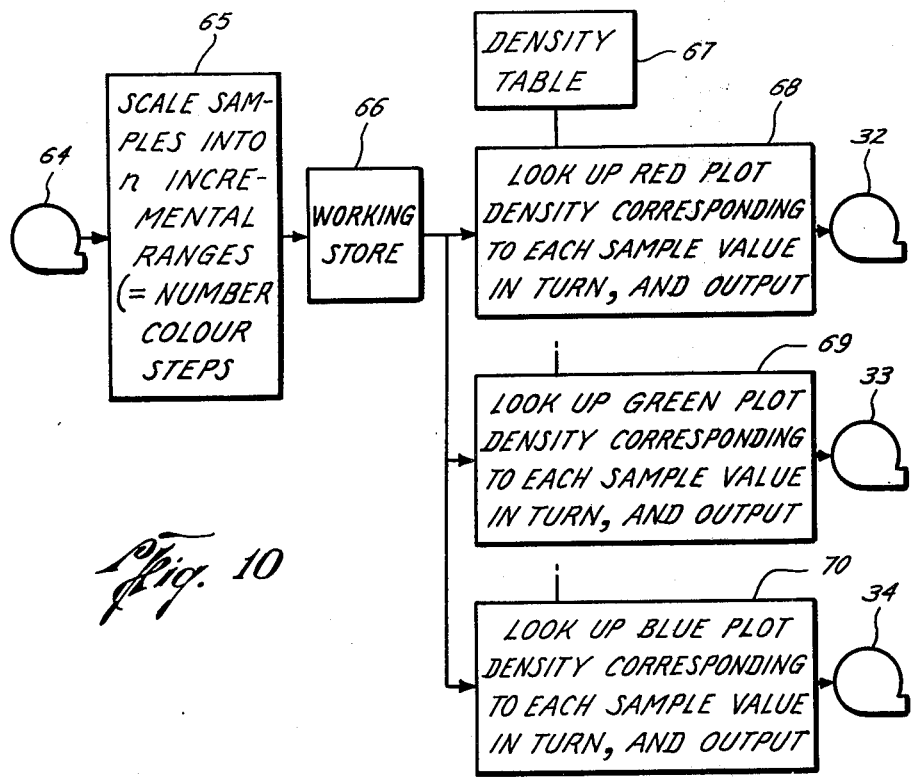
FIG. 10 shows how a single variable may be processed to yield three variables in form suitable for input to FIG. 6.

In FIG. 10, process steps for controlling a digital computer to perform the present invention are set forth. The waveform or variable to be displayed is available from storage means 64. It is scaled at process step 65 into a number n of incremental ranges corresponding to the number n of color steps to be displayed (for the example of FIG. 2, five steps). The working store 66 therefore contains all the samples input from storage 64, but these samples can have only one of the n possible values. For each of these possible values there is stored in a density table 67 the densities of the red, green and blue plots which will provide the final color corresponding to such sample value. An example table is given hereinafter. Operation step 68 causes the computer to search or look up, in the stored density 67, the red plot density table corresponding to each sample value in turn, and to output at 32 a string or series of red plot density values corresponding to the string or series of input samples constituting the original variable. Either simultaneously or sequentially, a like operation is then performed at steps 69 and 70 to obtain similar strings or series of green and blue plot density values; these are recorded at 33 and 34, respectively.

The three output storage media 32, 33 and 34 (which may be the same tape if the generation and/or plotting operations are done sequentially) correspond to the first three inputs of FIG. 6. Hence, application of the techniques described hereinbefore with reference to FIGS. 6 through 9 produces the desired final plot in color. Other variables 62 are added (as in FIG. 6, and described hereinbefore) in order to superimpose variable-area or variable-density traces on this color plot.

A suitable density table 67 for the case of the aforesaid LGP-2703 plotter, which has 16 possible densities defined by a 4-bit plotting instruction is set forth below. These 16 densities are denoted by levels 0 through 15, for which colors representing 26 sample-value ranges, are then synthesized from these 16 densities by the combinations shown in Table 1.

Table 1

| Sample Value | Blue Density | Yellow-Green Density | Red Density |
| --- | --- | --- | --- |
| 0 | 15 | 0 | 0 |
| 1 | 13 | 0 | 0 |
| 2 | 11 | 0 | 0 |
| 3 | 10 | 0 | 0 |
| 4 | 9 | 1 | 0 |
| 5 | 8 | 2 | 0 |
| 6 | 7 | 3 | 0 |
| 7 | 6 | 4 | 0 |

Table 1-continued

| Sample Value | Blue Density | Yellow-Green Density | Red Density |
|---|---|---|---|
| 8 | 5 | 5 | 0 |
| 9 | 4 | 6 | 0 |
| 10 | 3 | 7 | 0 |
| 11 | 2 | 8 | 0 |
| 12 | 1 | 9 | 0 |
| 13 | 0 | 9 | 1 |
| 14 | 0 | 8 | 2 |
| 15 | 0 | 7 | 3 |
| 16 | 0 | 6 | 4 |
| 17 | 0 | 5 | 5 |
| 18 | 0 | 4 | 6 |
| 19 | 0 | 3 | 7 |
| 20 | 0 | 2 | 8 |
| 21 | 0 | 1 | 9 |
| 22 | 0 | 0 | 10 |
| 23 | 0 | 0 | 11 |
| 24 | 0 | 0 | 13 |
| 25 | 0 | 0 | 15 |

This table is given solely for purposes of illustration, and major variations on it are possible and beneficial for particular purposes. One such variation is the provision of a greater or smaller number of color steps or sample values. Another variation is for the accommodation of particular photographic materials, light sources, filters of processing techniques. Another variation is to accomplish the optimum adaptation of the display to the nature of the variable being displayed (in particular, its amplitude distribution). Another variation is the provision of a bias to the display (for example, in the table above, the representation of sample values 0–3 by a constant blue density of 10). Another variation is for adaptation of the visual impact to the expected measure of error in the variable displayed. (An example of this occurs in the display of interval velocities superimposed on a seismic cross-section; the highest values of interval velocity are usually those which are least accurately measured, and it has been found best to display these in shades of brown and orange rather than in bright red.)

Table 2 gives density values which have been found particularly appropriate to the display of interval velocities. The 29 color shades may conveniently represent increments of 150 meters/second in interval velocity, with the first step beginning at 1500 meters/second.

Table 2

| Sample Value | Interval Velocity, m/s | Colour | Cyan Density | Yellow Density | Magenta Density |
|---|---|---|---|---|---|
| 0 | 1500 | Indigo | 14 | 0 | 14 |
| 1 | 1650 | | 15 | 0 | 13 |
| 2 | 1800 | | 15 | 0 | 12 |
| 3 | 1950 | Blue | 15 | 0 | 11 |
| 4 | 2100 | | 15 | 0 | 10 |
| 5 | 2250 | | 15 | 0 | 9 |
| 6 | 2400 | | 15 | 0 | 6 |
| 7 | 2550 | | 15 | 8 | 0 |
| 8 | 2700 | | 15 | 9 | 0 |
| 9 | 2850 | Green | 15 | 11 | 0 |
| 10 | 3000 | | 14 | 13 | 0 |
| 11 | 3150 | | 13 | 15 | 0 |
| 12 | 3300 | | 12 | 15 | 0 |
| 13 | 3450 | | 11 | 15 | 0 |
| 14 | 3600 | | 10 | 15 | 0 |
| 15 | 3750 | | 9 | 15 | 0 |
| 16 | 3900 | | 8 | 15 | 0 |
| 17 | 4050 | Yellow | 7 | 15 | 0 |
| 18 | 4200 | | 0 | 15 | 5 |
| 19 | 4350 | | 0 | 15 | 8 |
| 20 | 4500 | | 0 | 15 | 10 |
| 21 | 4650 | | 0 | 15 | 11 |
| 22 | 4800 | Brown | 0 | 15 | 12 |
| 23 | 4950 | | 0 | 15 | 13 |
| 24 | 5100 | | 0 | 15 | 14 |
| 25 | 5250 | | 0 | 15 | 15 |
| 26 | 5400 | | 0 | 11 | 15 |
| 27 | 5550 | | 0 | 9 | 15 |
| 28 | 5700 | Magenta | 0 | 7 | 15 |

The density values given in Table 2 are complemented in the manner set forth, in conjunction with the techniques of FIGS. 6, 9A and 9C, and with Ektacolor RC37 paper as set forth, so that they yield the colors indicated in the third column of Table 2 (with appropriate gradation therebetween).

Figure 11:
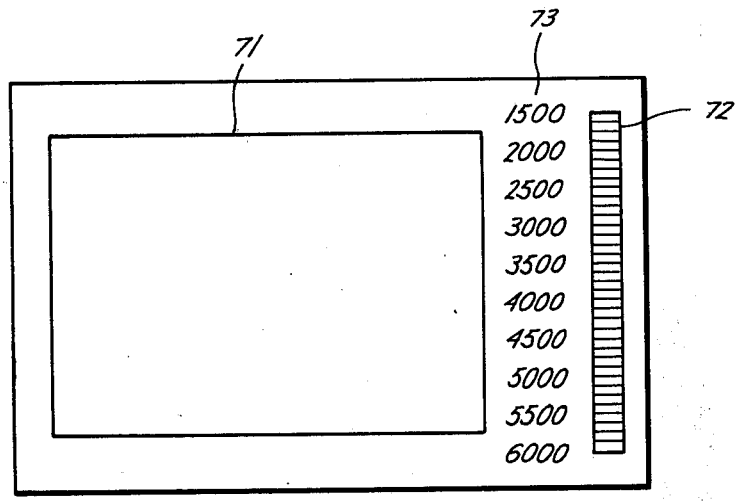
FIG. 11 illustrates the addition of a color key to the display of one or more variables in color.

Quantitative assessments of the variable displayed in color may be assisted during analysis if each ploted output sheet carries therewith a color key, and this constitutes an important part of the invention. As suggested in FIG. 11 (which is an example adapted to the illustration of Table 2), a main display 71 is accompanied by a color key 72. This color key 72 is a broad trace to which the sample values of the first column of Table 2 are applied in turn, producing the color gradation indicated by the third column of Table 2. The numerical values of the variable with which the colors of the key 72 are associated (that is, the second column of Table 2) are annotated by the side of the key 72 as a color calibration, as shown in part at 73. Thus a color displayed on the main display 71 may be matched by the analyst to the corresponding colour on the key 72, and thereby identified with a numerical value (or range of values) of the variable.

Although the practice of the invention has been described primarily with reference to specific examples, these examples do not limit the invention. The same techniques are appropriate wherever the interpretation of a plurality of variables is best done by a skilled human analyst, and where the problem is the optimum manner of transferring the interrelation between these variables to the analyst visually.

I claim:

1. A method of forming color graphic displays directly from a sequence of input digital data values, wherein differing colors at data display points in the color displays are quantitatively indicative of differing values or ranges of values of the digital data, comprising:
   a. forming an assignment table comprised of a set of numerical codes referenced as a two-dimensional matrix wherein one dimension of the matrix represents sample values of the data to be displayed, each sample value representing an assigned range from a plurality of ranges into which the input data values are partitioned, and the other dimension of the matrix representing a plurality of component displays, one component display for each component color in the color displays to be formed, said numerical codes specifying the visual image densities to be formed at data display points of the component displays and further specifying the relative density of each component color in the color correspondng to the sample value associated with such display points;
   b. processing the input digital data sequence to determine the sample values for the data display points;

c. assigning numerical codes from the assignment table to define image densities of the data display points according to the sample values thereof;
d. organizing the numerical codes assigned to the data display points into output sequences for each of the component displays;
e. forming a component display for each output sequence; and
f. displaying in superimposition the component displays in their respective component colors, to thereby form the color graphic display wherein the resulting colors of the data display points are quantitatively indicative of the input digital data.

2. The method of claim 1 wherein said step of forming an assignment table includes assigning the same group of numerical codes to more than one sample value.

3. The method of claim 1, wherein said step of forming an assignment table includes assigning the same sample values to more than one range.

4. The method of claim 1, wherein said step of processing the input digital data sequence includes processing the input data to define the data values to be displayed.

5. The method of claim 1, wherein different component displays are related to different input data sequences and wherein:
said step of displaying comprises displaying the component displays to quantitatively indicate the interrelationship between the variables represented in the different input data sequences.

6. The method of claim 1, wherein said step of forming component displays includes displaying the data display points as contiguous discrete image elements to form spatially continuous component displays.

7. The method of claim 1, wherein the component displays are formed from a plurality of image elements and wherein each data display point is associated with a plurality of discrete image elements in the component displays.

8. The method of claim 1, wherein the digital data values represent plural functions of a related variable, and wherein:
a. said step of forming comprises forming a component display for each of the plural functions; and
b. said step of displaying comprises merging the component displays of the plural functions wherein relations between the plural functions of the related variable are indicated by the mixture of color in the merged displays.

9. The method of claim 8, further including the step of:
forming a calibrated color key indicating mixtures of the densities of the component displays, wherein the relationship between the numerical values of variables being displayed may be determined.

10. The method of claim 8, further including the steps of:
a. forming a variable area trace whose area varies in accordance with varying magnitude of an additional function of the related variable; and
b. merging the variable area trace with the merged monochrome displays.

11. The method of claim 8, further including the steps of:
a. forming a variable density trace whose density varies in accordance with varying magnitude of an additional function of the related variable; and
b. merging the variable density trace with the merged monochrome displays.

12. The method of claim 8, wherein said step of forming a monochrome display comprises:
forming a display of the complement of the variable function.

13. The method of claim 8, wherein the plural functions of a related variable are functions of depth in a borehole said step of forming a monochrome display comprises:
forming a monochrome display for each of plural functions of depth in a borehole.

14. The method of claim 8, wherein said step of forming a monochrome display comprises:
applying input signals, each indicative of the magnitude of one of the plural functions, to different color input terminals of a color cathode ray tube.

15. The method of claim 8, wherein said step of forming a component display comprises:
a. energizing a plurality of sources of colored light; and
b. modulating the output of the plural colored light sources with signals whose magnitude varies in accordance with the numerical codes.

16. The method of claim 8, wherein:
a. said step of forming a component display comprises:
1. energizing a source of colored light to expose a strip of film for each of the plural functions;
2. modulating the output of the light source with a signal whose magnitude varies in accordance with the numerical codes; and
b. said step of merging comprises:
1. aligning the exposed strips of film;
2. illuminating the aligned, exposed strips; and
3. photographing the illuminated strips.

17. The method of claim 8, wherein:
a. said step of forming a component display comprises:
1. energizing a source of colored light to expose a strip of film for each of the plural functions;
2. modulating the output of the colored light source with a signal whose magnitude varies in accordance with the numerical codes; and
b. said step of merging comprises:
1. illuminating the exposed strips of film;
2. optically filtering the light illuminating the exposed strips so that a single color of light is provided for each strip of film; and
3. exposing color film to each individually illuminated film strip.

18. The method of claim 8, wherein:
a. said step of forming a component display comprises dyeing a variable density trace formed on monochrome film; and
b. said step of merging comprises:
1. aligning the dyed traces;
2. illuminating the dyed traces; and
3. photographing the illuminated, dyed traces.

19. The method of claim 1, wherein the input digital data values are geophysical measurements along lines in a grid and wherein a color graphic display is formed for each line in the grid and further including the step of:
assembling the color graphic displays according to the position of the lines in the grid.

20. The method of claim 1, further including the step of:

forming a calibrated color key indicating mixtures of the densities of the graphic display, wherein numerical values of the data being displayed may be determined.

21. The method of claim 1, wherein the digital data values are geophysical functions of a common independent variable, and further including the steps of:
   a. varying an output trace indication in accordance with variations of a first geophysical variable as a function of the common independent variable; and
   b. merging the output trace indication with the superimposed component displays.

22. The method of claim 1, wherein the digital data values are geophysical functions of a common independent variable, and wherein said step of processing comprises:
   a. processing the seismic data in a data processing machine to obtain seismic reflections as a first geophysical variable; and
   b. processing the seismic data in a data processing machine to obtain an auxiliary seismic variable as a second geophysical variable.

23. The method of claim 22, wherein said step of processing the seismic data in a data processing machine to obtain an auxiliary seismic variable comprises the step of:
   determining the interval velocities of the seismic signals.

24. The method of claim 22, wherein said step of processing the seismic data in a data processing machine to obtain an auxiliary seismic variable comprises the step of:
   determining the measure of coherence between reflection events of the seismic data.

25. The method of claim 22, wherein said step of processing the seismic data in a data processing machine to obtain an auxiliary seismic variable comprises the step of:
   determining the strength of seismic reflections in the seismic data.

26. The method of claim 22, wherein said step of processing the seismic data in a data processing machine to obtain an auxiliary seismic variable comprises the step of:
   determining the cross dip of subsurface reflection elements.

27. The method of claim 22, wherein:
   a. said step of processing the seismic data in a data processing machine to obtain an auxiliary seismic variable comprises:
      1. determining the stength of seismic reflections in the seismic data; and
      2. determining the coherence of seismic reflections in the seismic data; and
   b. said step of displaying comprises displaying the strength of only those seismic reflections whose coherence exceeds a threshold level.

28. The method of claim 22, wherein:
   said step of displaying comprises displaying only those auxiliary seismic variables whose values exceed a threshold level.

* * * * *

UNITED STATES PATENT AND TRADEMARK OFFICE
CERTIFICATE OF CORRECTION

PATENT NO. : 3,961,306
DATED : June 1, 1976
INVENTOR(S) : NIGEL A. ANSTEY

It is certified that error appears in the above–identified patent and that said Letters Patent are hereby corrected as shown below:

Column 13, line 63: "monochrome" should read --component--

Column 14, lines 2, 4, 9, 11 and 14: "monochrome" should read --component--.

Signed and Sealed this

Twenty-eighth Day of September 1976

[SEAL]

Attest:

RUTH C. MASON
*Attesting Officer*

C. MARSHALL DANN
*Commissioner of Patents and Trademarks*